(12) United States Patent
Knoop

(10) Patent No.: US 6,701,626 B2
(45) Date of Patent: Mar. 9, 2004

(54) HAND TOOL WITH CHANGEABLE BLADE

(75) Inventor: Heinz-Peter Knoop, Solingen (DE)

(73) Assignee: Lagos GmbH, Dannenwalde (DE)

( * ) Notice: Subject to any disclaimer, the term of this patent is extended or adjusted under 35 U.S.C. 154(b) by 0 days.

(21) Appl. No.: 10/202,466

(22) Filed: Jul. 24, 2002

(65) Prior Publication Data

US 2003/0019110 A1 Jan. 30, 2003

(30) Foreign Application Priority Data

Jul. 24, 2001 (DE) .......................... 101 36 019
Jul. 24, 2001 (DE) .................... 201 12 194 U

(51) Int. Cl.[7] ............................... B26B 1/00
(52) U.S. Cl. .......................... 30/337; 30/331
(58) Field of Search ..................... 30/337, 338, 331, 30/330

(56) References Cited

U.S. PATENT DOCUMENTS

| 324,563 | A | * | 8/1885 | Koska | 30/337 |
| 624,737 | A | * | 5/1899 | Bay | 30/330 |
| 1,018,210 | A | * | 2/1912 | Segel et al. | 30/337 |
| 2,439,071 | A | * | 4/1948 | Basham | 30/337 |
| 4,169,312 | A | * | 10/1979 | Mar | 30/331 |
| 5,430,941 | A | * | 7/1995 | Lin | 30/260 |
| 6,578,271 | B1 | * | 6/2003 | Macek | 30/337 |

FOREIGN PATENT DOCUMENTS

DE 240 786 2/1911

* cited by examiner

Primary Examiner—Stephen Choi
(74) Attorney, Agent, or Firm—Herbert Dubno; Andrew Wilford

(57) ABSTRACT

A hand tool has an elongated blade having a longitudinally inwardly projecting tang having a longitudinal back edge formed with a plurality of transversely directed teeth, a longitudinal front edge, and an elastically transversely deflectable retaining formation. A handle forms a longitudinally open seat having one longitudinally extending side wall. A retaining lever has an edge formed with teeth and an elastically transversely deflectable retaining formation. The lever is displaceable between a closed holding position with the lever teeth meshing with the blade teeth and pressing the blade against the seat wall and the formation transversely engaging and bearing elastically against the blade retaining formation, and an open freeing position with the lever teeth out of mesh with the blade teeth and the formation out of engagement with the blade retaining formation.

10 Claims, 4 Drawing Sheets

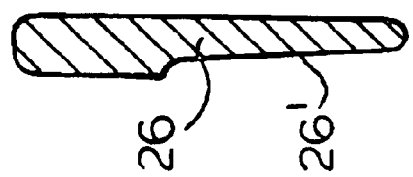
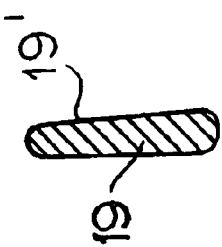
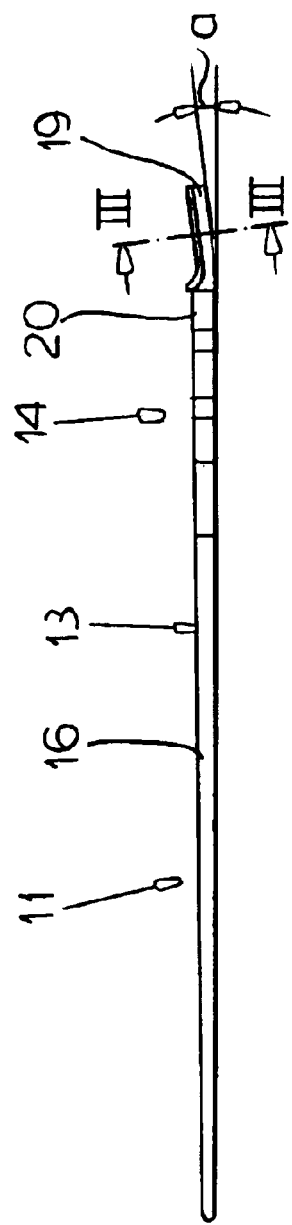

HAND TOOL WITH CHANGEABLE BLADE

FIELD OF THE INVENTION

The present invention relates to a hand tool. More particularly this invention concerns such a tool having a handle portion, a blade, and a system for releasably securing the blade to the handle so it can be exchanged for an identical replacement blade or for another blade serving a different purpose.

BACKGROUND OF THE INVENTION

A hand tool is known, for instance from German patent 240,786 of C. Wusthof, which has a blade having a longitudinally inwardly projecting tang that fits in a socket or seat in a separate handle part. A pivotal lever on the handle can swing between a flush holding position in which a transverse retaining formation on the lever engages a transverse retaining formation on the tang and locks the blade to the handle and an extended freeing position disengaging these retaining formations and permitting the blade to be pulled out of the handle and replaced by another blade. A clip on the handle can retain the lever in the flush holding position to maintain the blade locked to the handle, and a spring normally urges the retaining lever into the extended freeing position. Thus one knife blade can be exchanged for another, or for a saw blade or specialty blade. The blade, when installed, is very solidly mounted to the handle so it can be used for cutting, prying, or twisting like with a one-piece tool.

A disadvantage of this system is that both releasing and securing a blade are two-step operations. To release the blade the clip must be opened and the lever flipped back; to secure the blade the lever must be swung forward and the clip closed. If the clip is accidentally bumped and opened, the lever will swing out under spring force and the blade will separate from the handle. Another disadvantage is that the contact area between the retaining formation is limited so that it can loosen when worn, letting the blade move relative to the handle when locked in place.

OBJECTS OF THE INVENTION

It is therefore an object of the present invention to provide an improved hand tool with a changeable blade.

Another object is the provision of such an improved hand tool with a changeable blade which overcomes the above-given disadvantages, that is which is easy to use and which ensures a very solid anchoring of the blade in the handle.

SUMMARY OF THE INVENTION

A hand tool has according to the invention an elongated blade having a longitudinally inwardly projecting tang having a longitudinal back edge formed with a plurality of transversely directed teeth, a longitudinal front edge, and an elastically transversely deflectable retaining formation. A handle forms a longitudinally open seat having one longitudinally extending side wall. A retaining lever has an edge formed with teeth and an elastically transversely deflectable retaining formation. The lever is displaceable between a closed holding position with the lever teeth meshing with the blade teeth and pressing the blade against the seat wall and the formation transversely engaging and bearing elastically against the blade retaining formation, and an open freeing position with the lever teeth out of mesh with the blade teeth and the formation out of engagement with the blade retaining formation.

Thus this tool is quite simple. The interaction of the retaining formations hold the lever releasably in the closed holding position so that no biasing spring or clip are needed. Changing blades is simply a question of pulling out the retaining lever to free the blade and pushing it back in after the replacement blade is in place. There is no clip to actuate.

According to the invention the retaining formation of the blade is at an inner end of the tang. In addition the tang and blade lie in a longitudinal plane and the retaining formation of the blade is bent at an acute angle out of the plane.

The retaining formations in accordance with the invention have flat faces flatly engaging each other in the closed holding position. In this manner enough friction is present to ensure adequate holding of the lever in the closed position. To maximize this effect the tang tapers away from the blade. Furthermore the teeth of the retaining lever fit complementarily in the closed holding position with the teeth of the tang.

The handle according to the invention has a transversely extending structure spaced from the side wall. The tang is snugly engaged between the side wall and the structure when inserted in the seat. This structure is a crosswise pin.

The blade in accordance with the invention has a transversely projecting finger shield. This finger shield, the blade, and the tang are unitarily formed of metal.

BRIEF DESCRIPTION OF THE DRAWING

The above and other objects, features, and advantages will become more readily apparent from the following description, reference being made to the accompanying drawing in which:

FIG. 2 is a view taken in the direction of arrow II of FIG. 1 of the blade of the tool;

FIGS. 3 and 4 are large-scale sections taken along lines III—III and IV—IV of FIGS. 2 and 1, respectively.

SPECIFIC DESCRIPTION

Figure 1:
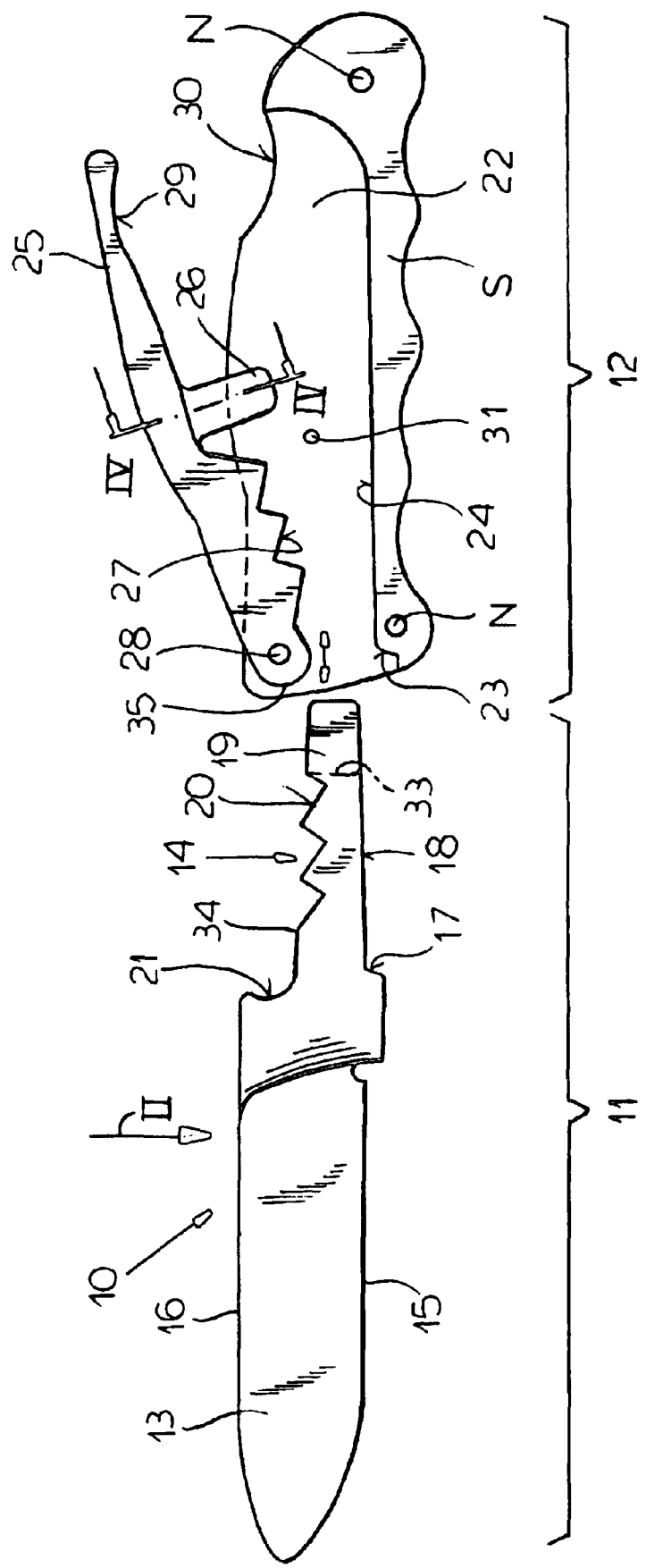
FIG. 1 is an exploded side view of the hand tool according to the invention.

As seen in FIGS. 1 through 4, a hand tool 10 according to the invention has a blade part 11 and a handle part 12. Here the tool 10 is a knife, but by different blade parts can be fitted to the same handle part 12 to allow it to function as different types of knives, a saw, a prying or screwing tool, or virtually any other type of bladed small hand tool.

The blade part 11 has a blade 13 with a front longitudinally extending cutting edge 15 that is directed transversely forward and a rear longitudinally extending back edge 16. A tang 14 extends longitudinally inwardly (to the right in FIGS. 1 and 2) from the blade 13 and is unitarily made of metal therewith. It is substantially narrower than the blade 13 and has a straight front edge 18 generally aligned with the front cutting edge 15 and a back edge 34 formed with teeth 20 and recessed somewhat transversely forward from the back blade edge 16. It further has a rear end formation 19 that is bent to the side at a small acute angle a. Between the tang 14 and the blade 13 there is a ricasso-forming front abutment 17 between the front edges 15 and 18 and an inwardly open part-circular seat 21 at the inset between the offset back edges 16 and 34.

The handle part 12 has a body formed of two symmetrically identical side parts S secured together by rivets N to form a longitudinally outwardly open socket 22 at the outer end of which opens a seat 23 into which the abutment 17 can fit when the front tang edge 18 rests on a surface 24 of the seat 22. When thus engaged (see FIGS. 5 and 6) a pin 31 extending between the side parts S engages the back edge 34 of the tang 14 to hold the tang 14 down in the seat 22.

A lever 25 is mounted at a pivot 28 between the side parts S and has a transversely projecting locking arm formation 26 engageable behind the rear end formation 19 of the blade 11, a rounded front end 35 complementary to the seat 21 and centered on the pivot 28, and teeth 27 complementary to the teeth 20 on the back edge 34 of the tang 14. This lever 25 has at its rear end a cutout 29 cooperating with a cutout 30 of the side parts S to allow a user to grasp underneath it to pull it back to the extended freeing position of FIG. 1.

Figure 5:
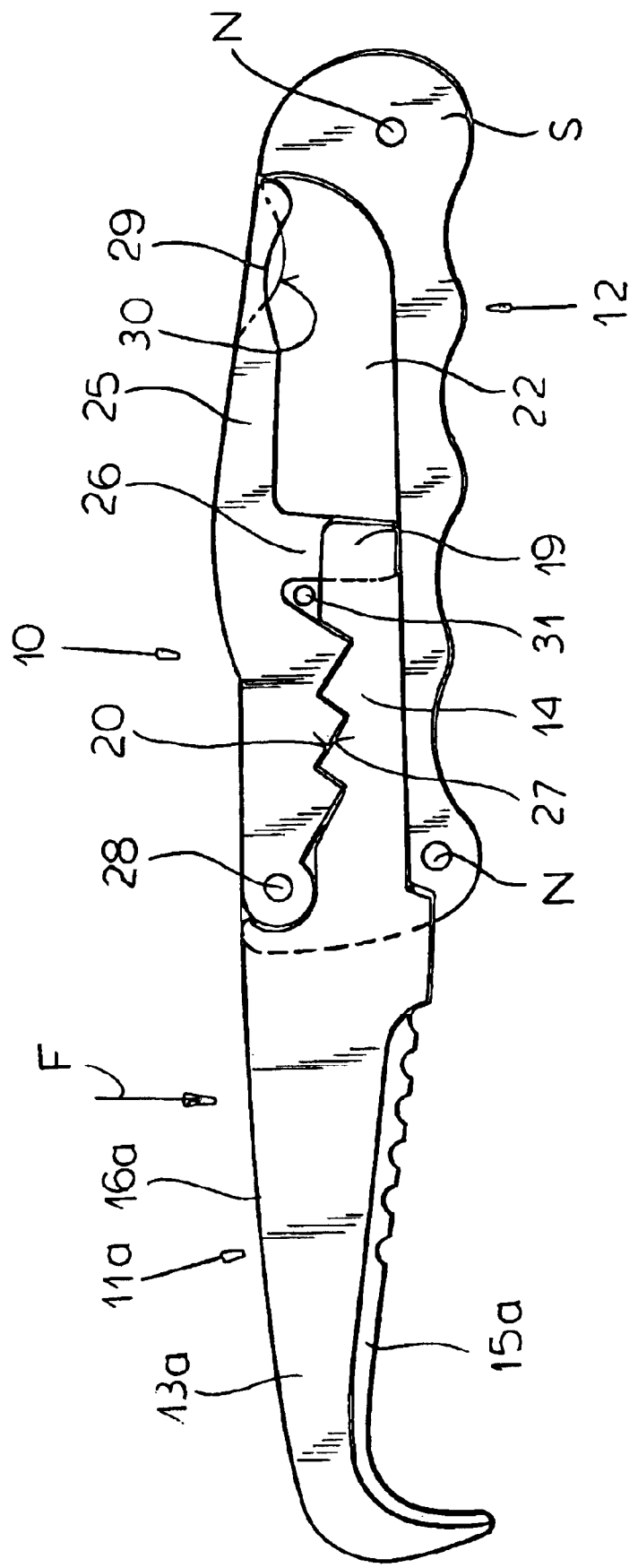
FIGS. 5 and 6 are side views showing the hand tool with two different blades.
Figure 6:
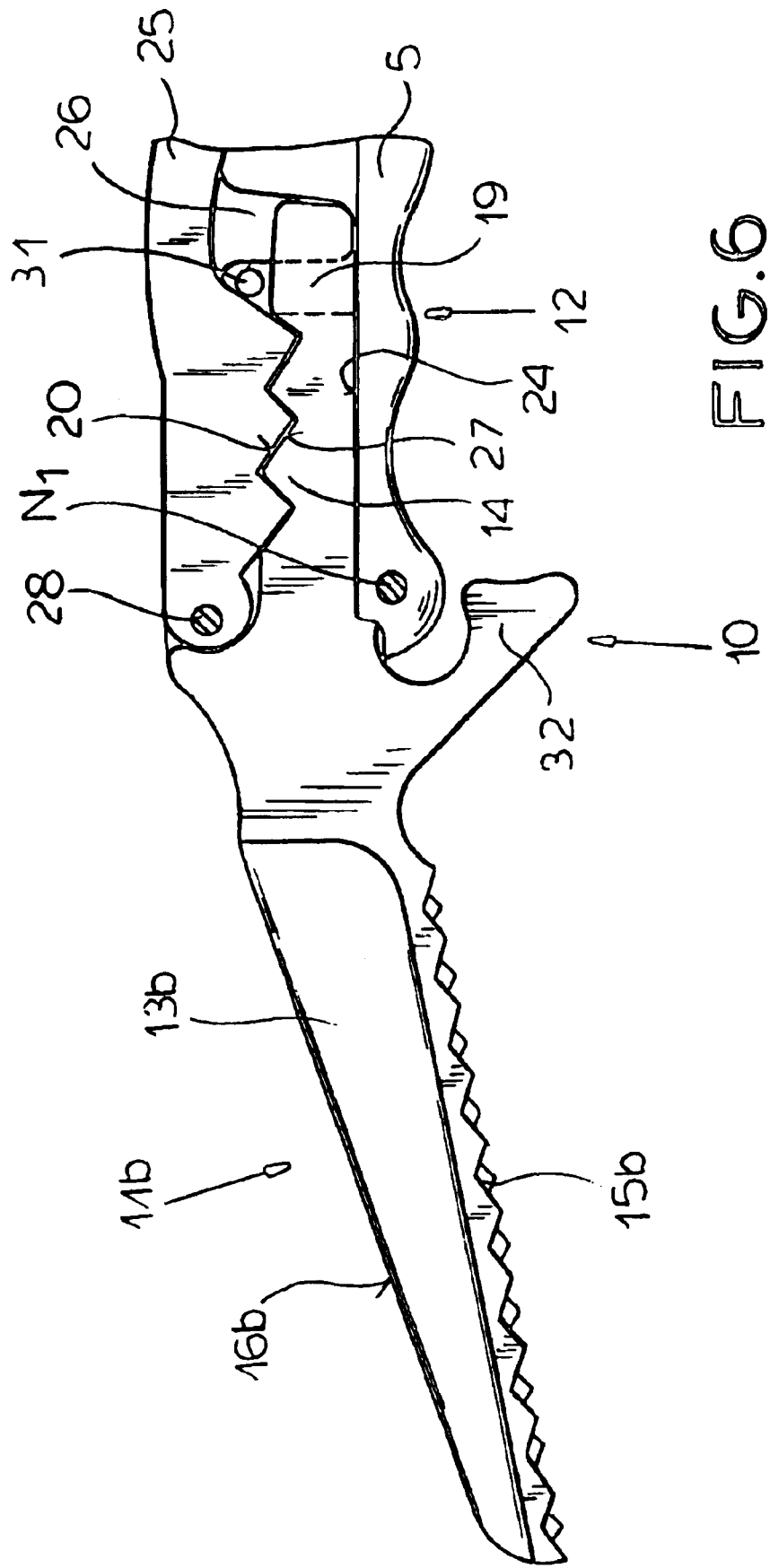

FIG. 5 illustrates a system with a hooked blade part 11a having a blade 13a with a curved, sharp, and serrated front edge 15a and a back edge 16a. In FIG. 6 a blade part 11b has a saw blade 13b with a toothed front edge 15b, a straight back edge 16b, and a finger-protecting extension 32 at the front edge 15b. In both systems the tang 14 is identical to that of FIG. 1, and both blade parts 11a and 11b can be mounted on the same handle part 12.

In order to assemble the hand tool 10, the tang 14 of the blade part 11 is inserted in the socket 22 so as to slip back between the pin 31 and surface 24 until the front pivot end 35 of the lever 25 sits in the seat 21, the abutment 17 fits in the seat 23, the front tang edge 18 flatly engages the socket surface 24, and the rear tang edge 34 engages the pin 31. Then the lever 25 is pivoted from the FIG. 1 extended freeing position down into the closed holding position illustrated in FIGS. 5 and 6 to bring the teeth 27 into mating engagement with the teeth 20 and clamp the tang 14 solidly in the seat 22. Movement of the arm 26 behind the rear tang end 19 flexes this tang end 19 slightly about a line 33 and/or flexes the arm 26 so that the two formations 26 and 19 bear elastically on one another. The arm 26 has an angled face 26' complementary to an angled face 19' of the tang rear end 19 so that the two formations 19 and 26 will lie in surface contact with each other, providing enough friction that the lever 25 will not readily move back into the freeing position of FIG. 1. Thus when the lever 24 is swung down into the closed holding position of FIGS. 5 and 6 it is elastically retained in place by the formations 19 and 26. Only an intentional rearward pull on the lever 25, which is mainly flush with the handle side parts S, can free it and allow the blade part 11 to come free.

What is claimed is:

1. A hand tool comprising:
   an elongated blade having a longitudinally inwardly projecting tang having
      a longitudinal back edge formed with a plurality of transversely directed blade teeth,
      a longitudinal front edge, and
      an elastically transversely deflectable blade retaining formation;
   a handle forming a longitudinally open seat having one longitudinally extending side wall and shaped to receive the tang;
   a retaining lever having an edge formed with lever teeth and an elastically transversely deflectable lever retaining formation, the lever being displaceable between
      a closed holding position with the lever teeth meshing with the blade teeth, pressing the tang against the side wall, and with the lever retaining formation transversely engaging and bearing elastically against the blade retaining formation, and
      an open freeing position with the lever teeth out of mesh with the blade teeth and the lever retaining formation out of engagement with the blade retaining formation.

2. The hand tool defined in claim 1 wherein the blade retaining formation is at an inner end of the tang.

3. The hand tool defined in claim 1 wherein the tang and blade lie in a longitudinal plane and the blade retaining formation is bent at an acute angle out of the plane.

4. The hand tool defined in claim 1 wherein the retaining formations both have flat faces flatly engaging each other in the closed holding position.

5. The hand tool defined in claim 1 wherein the tang tapers away from the blade.

6. The hand tool defined in claim 1 wherein the lever teeth fit complementarily in the closed holding position with the blade teeth.

7. The hand tool defined in claim 1 wherein the handle has a transversely extending structure spaced from the side wall, the tang being snugly engaged between the side wall and the structure when inserted in the seat.

8. The hand tool defined in claim 7 wherein the structure is a crosswise pin.

9. The hand tool defined in claim 1 wherein the blade has a transversely projecting finger shield.

10. The hand tool defined in claim 9 wherein the finger shield, blade, and tang are unitarily formed.

* * * * *